(12) United States Patent
Smith

(10) Patent No.: US 9,000,310 B2
(45) Date of Patent: *Apr. 7, 2015

(54) SPLIT, NON-METALLIC ELECTRICAL INSULATING BUSHING

(71) Applicant: Bridgeport Fittings, Inc., Stratford, CT (US)

(72) Inventor: Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/169,952

(22) Filed: Jan. 31, 2014

(65) Prior Publication Data

US 2015/0053477 A1    Feb. 26, 2015

Related U.S. Application Data

(63) Continuation-in-part of application No. 13/974,739, filed on Aug. 23, 2013.

(51) Int. Cl.
| | |
|---|---|
| H02G 3/18 | (2006.01) |
| H01R 4/64 | (2006.01) |
| H01R 4/28 | (2006.01) |
| H02G 3/22 | (2006.01) |

(52) U.S. Cl.
CPC .................................... *H02G 3/22* (2013.01)

(58) Field of Classification Search
CPC ............ H01R 4/72; H01R 4/64; H01R 4/643; H01R 4/28; H01R 4/38; H01R 4/40; H02G 3/22

USPC .......... 174/666, 650, 77, 151, 152, 659, 668, 174/660, 664, 652; 439/367, 92, 100; 248/406, 412

See application file for complete search history.

(56) References Cited

U.S. PATENT DOCUMENTS

| | | | |
|---|---|---|---|
| 2,279,866 | A | 4/1942 | Ellinwood |
| 3,117,388 | A | 1/1964 | Clarke |
| 3,258,523 | A | 6/1966 | Leonard et al. |
| 3,365,693 | A | 1/1968 | Browne |
| 3,456,965 | A | 7/1969 | Gajewski et al. |
| 3,492,625 | A | 1/1970 | Bromberg |
| 3,609,631 | A | 9/1971 | Looney |
| 3,643,203 | A | 2/1972 | McLaughlin et al. |

(Continued)

FOREIGN PATENT DOCUMENTS

| | | |
|---|---|---|
| DE | 69707913 T2 | 6/2002 |
| EP | 2141397 A1 | 1/2010 |

*Primary Examiner* — Angel R Estrada
*Assistant Examiner* — Dimary Lopez Cruz
(74) *Attorney, Agent, or Firm* — Ware, Fressola, Maguire & Barber LLP

(57) ABSTRACT

A split, non-metallic electrical insulating bushing for placement on a terminating end of an electrical conduit, the bushing rotatable between a first open configuration and a second closed configuration and having first and second hemispherically shaped bushing portions. Both bushing portions have a first end and a second end. The first ends are dimensioned to rotate with respect to each other. The second end of the first bushing portion includes a bore for receipt of a fastener, while the second end of the second bushing portion includes an aperture dimensioned for receipt of the fastener. The second end of the first insulating portion has a projecting pin and the second end of the second insulating portion has an orifice dimensioned for receipt of the projecting pin.

18 Claims, 19 Drawing Sheets

(56) References Cited

U.S. PATENT DOCUMENTS

| | | | |
|---|---|---|---|
| 3,836,269 A * | 9/1974 | Koscik | 403/197 |
| 3,913,187 A | 10/1975 | Okuda | |
| 3,967,872 A | 7/1976 | Mooney et al. | |
| 4,159,859 A | 7/1979 | Shemtov | |
| 4,176,756 A | 12/1979 | Gellman | |
| 4,189,198 A | 2/1980 | Reichman | |
| 4,233,469 A | 11/1980 | Steppe | |
| 4,478,381 A | 10/1984 | Pittion et al. | |
| 4,637,097 A | 1/1987 | Secord | |
| 4,729,534 A * | 3/1988 | Hill et al. | 248/56 |
| 5,101,129 A * | 3/1992 | Butcher | 310/68 C |
| 5,245,131 A * | 9/1993 | Golden et al. | 174/652 |
| 5,305,978 A | 4/1994 | Current | |
| 5,306,973 A * | 4/1994 | Butcher et al. | 310/68 C |
| 5,385,373 A | 1/1995 | Love | |
| 5,504,973 A * | 4/1996 | Kameyama | 16/2.1 |
| 5,653,481 A | 8/1997 | Alderman | |
| 5,820,048 A | 10/1998 | Shereyk et al. | |
| 5,873,611 A | 2/1999 | Munley et al. | |
| 5,906,342 A | 5/1999 | Kraus | |
| 6,030,006 A | 2/2000 | Lin | |
| 6,161,589 A | 12/2000 | Bolotte et al. | |
| 6,164,604 A | 12/2000 | Cirino et al. | |
| 6,211,465 B1 * | 4/2001 | Streit | 174/653 |
| 6,561,471 B1 | 5/2003 | Hawie | |
| 6,708,377 B2 | 3/2004 | Maunder | |
| 6,840,782 B1 | 1/2005 | Borden et al. | |
| 7,178,203 B2 | 2/2007 | Pearson et al. | |
| 7,182,611 B2 | 2/2007 | Borden et al. | |
| 7,481,247 B2 | 1/2009 | Friedline et al. | |
| 7,740,211 B2 | 6/2010 | Dukes | |
| 7,915,545 B1 | 3/2011 | Bixler et al. | |
| 8,157,222 B1 | 4/2012 | Shirey et al. | |
| 8,220,113 B2 | 7/2012 | Morton et al. | |
| 8,231,392 B2 | 7/2012 | Garvin | |
| 8,246,095 B2 | 8/2012 | Radle et al. | |
| 8,328,458 B2 | 12/2012 | Werth | |
| 8,419,449 B1 | 4/2013 | Smith | |
| 8,794,882 B2 * | 8/2014 | Whaley et al. | 408/221 |
| 8,882,517 B2 | 11/2014 | Smith et al. | |
| 2005/0205722 A1 | 9/2005 | Krueger | |
| 2014/0332249 A1 * | 11/2014 | Barna | 174/68.3 |

* cited by examiner

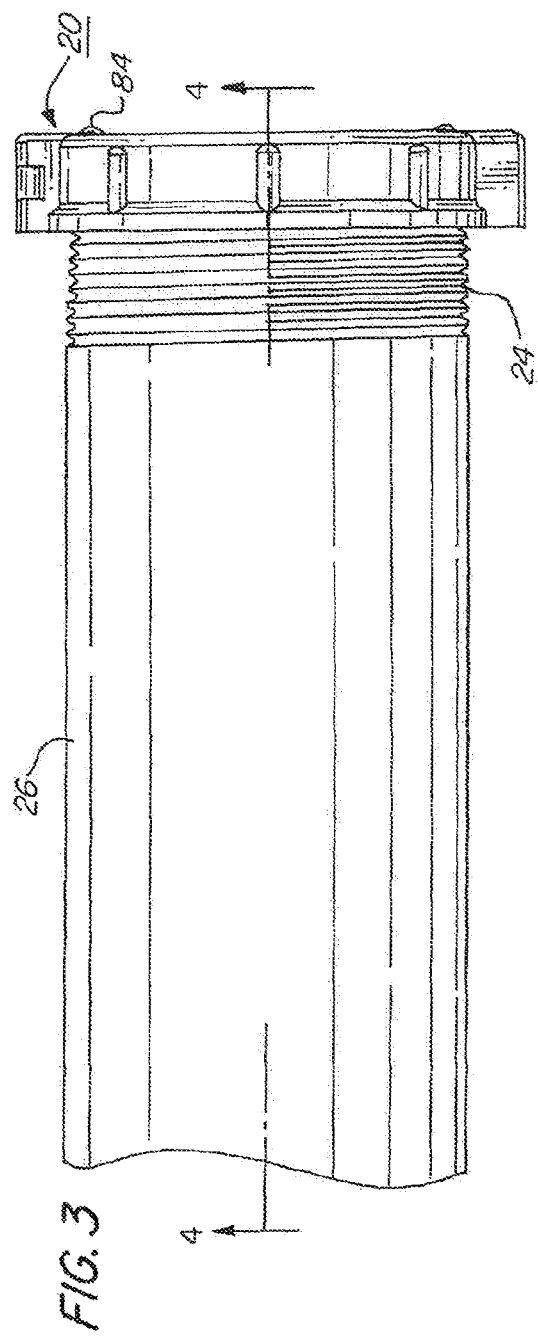
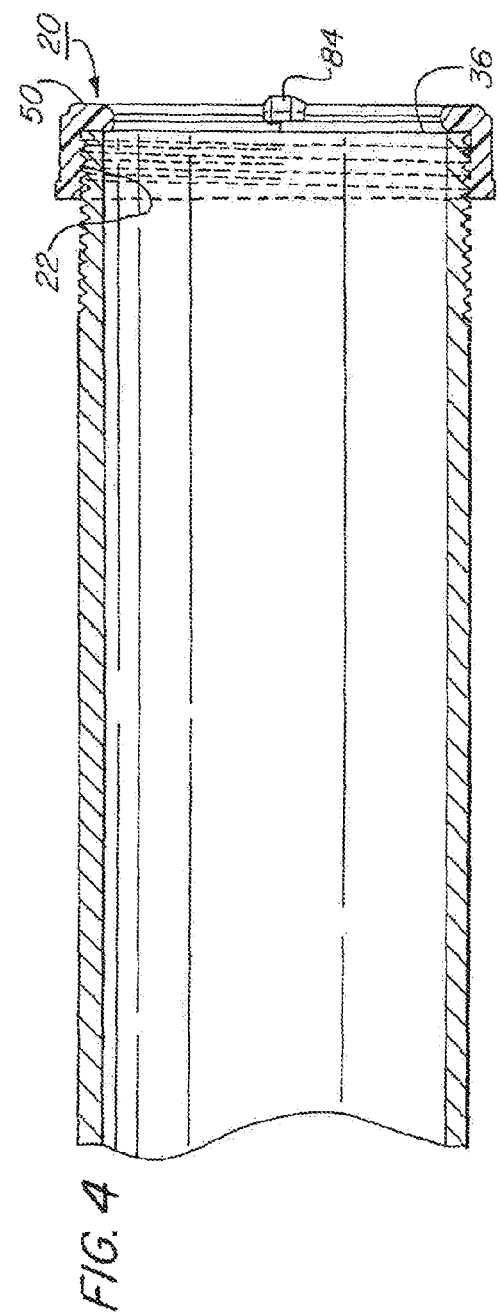

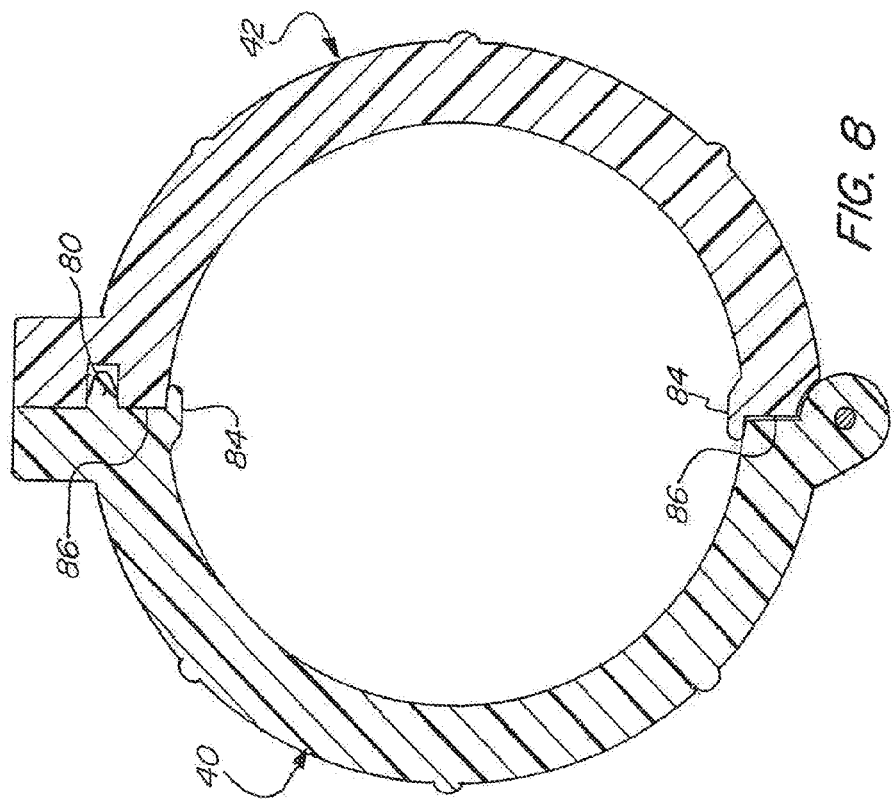
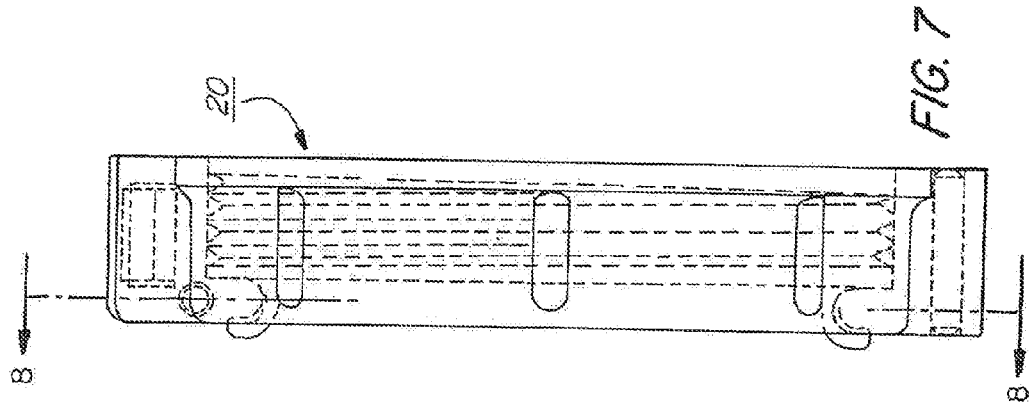

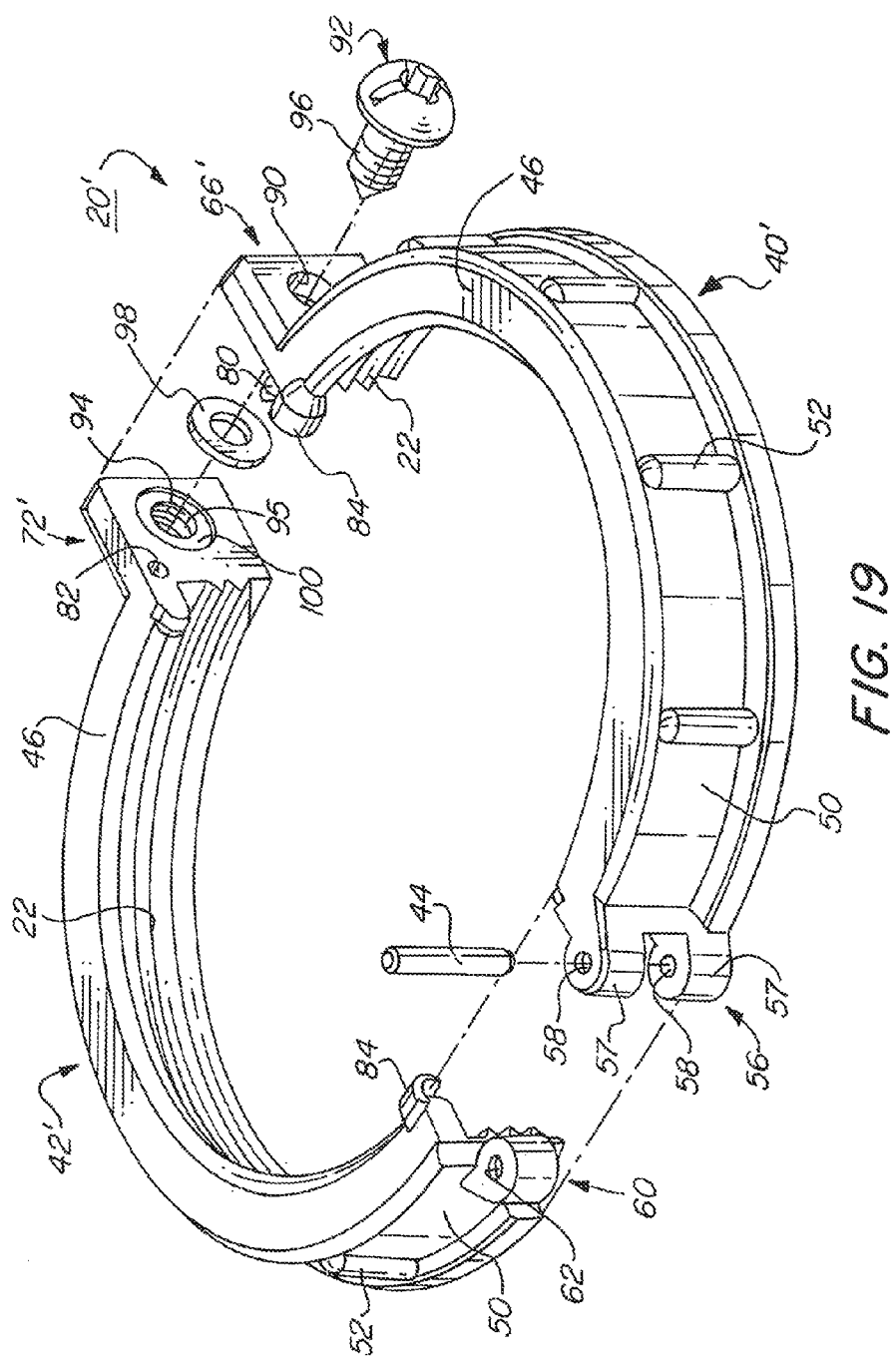

SPLIT, NON-METALLIC ELECTRICAL INSULATING BUSHING

CROSS-REFERENCE TO RELATED APPLICATION

The present application is a continuation-in-part application of U.S. patent application Ser. No. 13/974,739 filed on Aug. 23, 2013, from which priority is claimed, and which is incorporated by reference in its entirety.

TECHNICAL FIELD

The present invention relates to the field of electrical insulating bushings, particularly those for placement on a terminating end of an electrical conduit so as to prevent damage to insulated electrical conductors passing out of the conduit end.

BACKGROUND OF THE INVENTION

Electrical insulating bushings are known in the electrical fitting art and are typically installed on the terminal end of an electrical conduit so as to protect insulated electrical conductors passing through the conduit from coming into contact with the terminating end of the electrical conduit. Such electrical conduits are typically fabricated from metal and their terminating ends therefore are able to chafe the insulation on electrical conductors passing through the conduits, especially if such conductors make a bend as they exit the electrical conduits.

Although such non-metallic electrical insulating bushings are required to be placed on the end of electrical conduits by the National Electrical Code and/or various local electrical codes, it is possible during electrical installation at a building site that such bushings are not installed prior to pulling the electrical conductors through the electrical conduits used at the building site.

Therefore, it is particularly advantageous to have a non-metallic electrical insulating bushing that can be installed to a terminating an end of an electrical conduit after electrical conductors have been pulled through that conduit.

SUMMARY OF THE INVENTION

One aspect of an alternative embodiment of the present invention is a split, non-metallic electrical insulating bushing for placement on a terminating end of an electrical conduit, the bushing rotatable between a first open configuration and a second closed configuration comprising a first electrical insulating bushing portion having a substantially hemispherical shape with a first end and a second end, the first bushing portion including a rim, a second electrical insulating bushing portion having a substantially hemispherical shape with a first end and a second end, the first end dimensioned to rotate with the first end of the first insulating bushing portion, the second bushing portion including a rim, and means for allowing the first end of the first insulating bushing portion and the first end of the second insulating bushing portion to rotate with respect to each other, wherein the second end of the first insulating bushing portion includes a through bore for passage of a fastener, wherein the second end of the second insulating bushing portion includes an aperture dimensioned for receipt of the fastener, wherein the second end of the first insulating portion further comprises a projecting pin and wherein the second end of the second insulating portion further has an orifice formed therein dimensioned for receipt of the projecting pin when the split, non-metallic insulating bushing is in its second closed configuration, thereby providing enhanced securement of the split non-metallic insulating bushing when in the second closed configuration.

Another aspect of the present invention is a split, non-metallic electrical insulating bushing according to claim 1, wherein the aperture of the second insulating bushing is threaded and wherein the fastener has threads for engagement therewith.

A further aspect of the present invention is a split, non-metallic electrical insulating bushing according to claim 1, wherein the aperture of the second insulating bushing portion passes through the second end of the second insulating bushing portion and wherein the fastener is dimensioned to pass through said aperture.

A still further aspect of the present invention is a split, non-metallic electrical insulating bushing according to claim 3, wherein the fastener is secured to the second end of the second insulating bushing portion by a nut.

Another aspect of the present invention is a split, non-metallic electrical insulating bushing according to claim 1, wherein the first bushing portion has a flange attached to the rim, the flange projecting radially inward so as to overlie the terminating end of an electrical conduit when installed thereon and wherein the second bushing portion has a flange attached to the rim, the flange of the second insulating bushing projecting radially inward so as to overlie the terminating end of an electrical conduit when installed thereon.

A further aspect of the present invention is a split, non-metallic electrical insulating bushing according to claim 1, wherein the rim of the first insulating bushing portion and the rim of the second insulating bushing portion each include threads formed on an interior surface thereof, said threads dimensioned for threading engagement with threads formed on a terminating end of an electrical conduit.

A still further aspect of the present invention is a split, non-metallic electrical insulating bushing according to claim 1, wherein one end of the first insulating bushing portion has a seam cover that is dimensioned to overlie a gap between said end and the corresponding end of the second insulating bushing portion when the bushing is in the second closed configuration and wherein the second insulating bushing portion includes a seam cover that is dimensioned to overlie a gap between its other end and the corresponding other end of the first insulating bushing portion when the bushing is in the second closed configuration.

Another aspect of the present invention is a split, non-metallic electrical insulating bushing according to claim 1, wherein the means for allowing the first end of the first insulating bushing portion and the first end of the second insulating bushing portion to rotate with respect to each other includes a hinge pin and where the first end of the first insulating bushing portion and the first end of the second insulating bushing portion have bores formed therein for receipt of said hinge pin.

Another aspect of the present invention is a split, non-metallic electrical insulating bushing according to claim 1, wherein the rim of the first insulating bushing portion and the rim of the second insulating bushing portion end each include a plurality of ribs dimensioned to assist gripping the bushing.

A further aspect of the present invention is a split, non-metallic electrical insulating bushing according to claim 1, wherein the first insulating bushing portion and the second insulating bushing portion are formed from a thermoplastic material.

A still further aspect of the present invention is a split, non-metallic electrical insulating bushing according to claim 1, wherein the hinge pin is fabricated from zinc plated steel.

Another aspect of the present invention is a split, non-metallic electrical insulating bushing according to claim 1, wherein the fastener is a machine screw.

Another aspect of the present invention is a split, non-metallic electrical insulating bushing according to claim 1, wherein the fastener is a self-tapping machine screw.

A further aspect of the present invention is a split, non-metallic electrical insulating bushing according to claim 1, wherein a retaining washer is positioned on the fastener after passage of the fastener through the bore on the second end of the first insulating bushing portion.

A still further aspect of the present invention is a split, non-metallic electrical insulating bushing according to claim 1, wherein the first end of the second insulating bushing portion include a recess formed around the aperture, said recess dimensioned for receipt of the retaining washer when the bushing is in the closed configuration.

BRIEF DESCRIPTION OF THE DRAWINGS

For a fuller understanding of the nature and objects of the present invention reference should be made to the following detailed description taken in conjunction with the following drawings in which:

FIG. 3 is a side view of the non-metallic electrical insulating bushing attached to an electrical conduit.

FIG. 4 is a cross-sectional view of the non-metallic electrical insulating bushing and conduit taken along line 4-4 of FIG. 3.

FIG. 7 is a side cross-sectional view of the non-metallic electrical insulating bushing.

FIG. 8 is a cross-sectional view of the non-metallic electrical insulating bushing taken along line 8-8 of FIG. 7.

FIG. 19 is an exploded perspective view of the non-metallic electrical insulating bushing according to another embodiment of the present invention showing the bushing in its open configuration.

DETAILED DESCRIPTION

Figure 1:
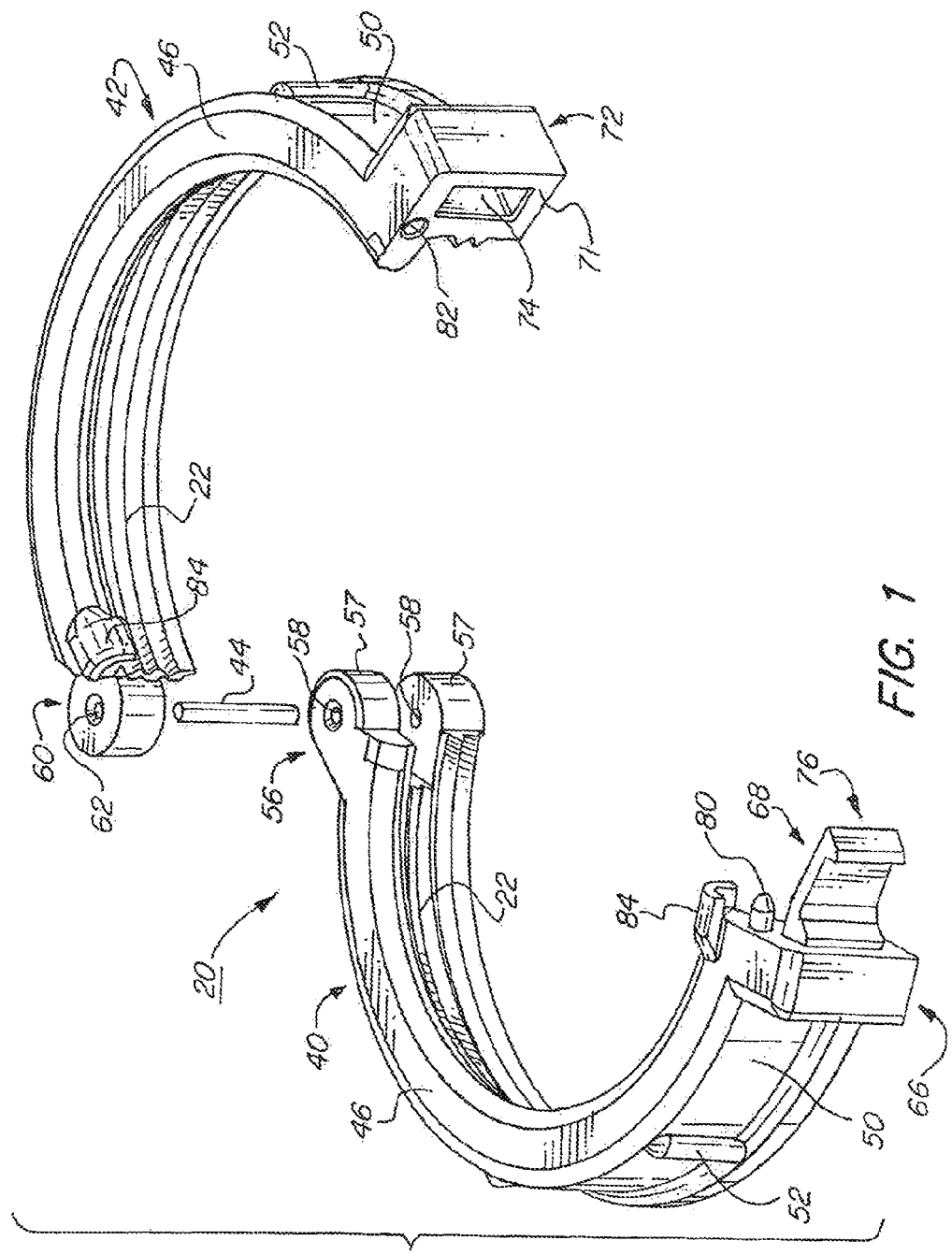
FIG. 1 is an exploded perspective view of the non-metallic electrical insulating bushing according to an embodiment of the present invention showing the bushing in its open configuration.
Figure 1A:
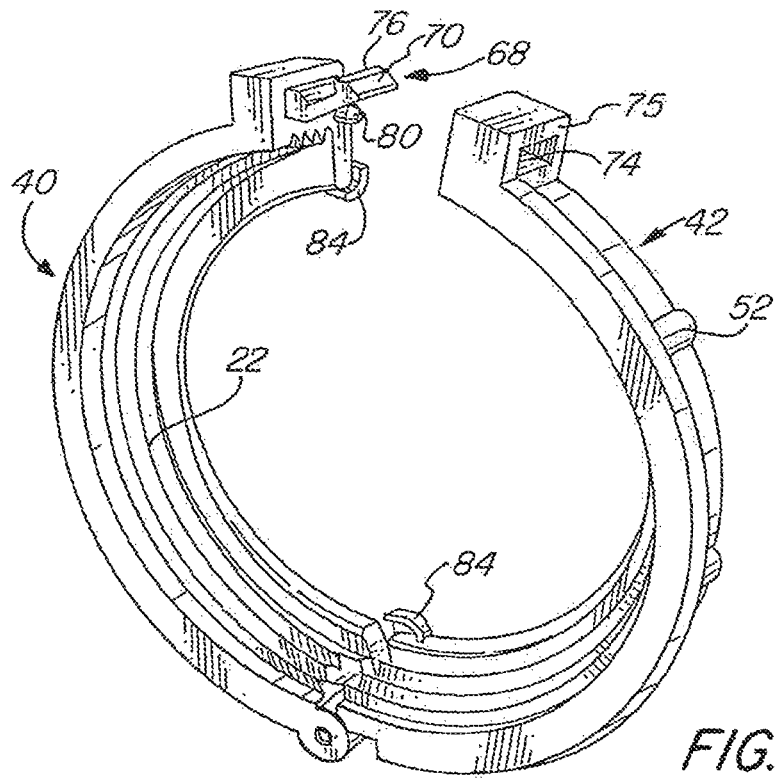
FIG. 1A is a bottom perspective view of the non-metallic electrical insulating bushing shown in FIG. 1 taken from a conduit inlet end showing the bushing in its open configuration.
Figure 1B:
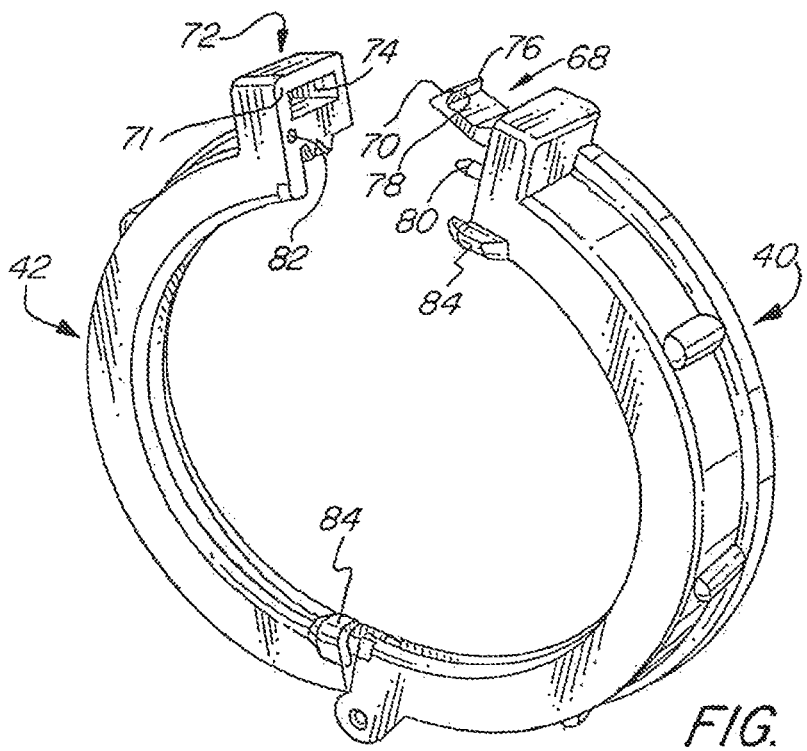
FIG. 1B is a top perspective view of the non-metallic electrical insulating bushing shown in FIG. 1 taken from a conduit outlet end showing the bushing in its open configuration.
Figure 2:
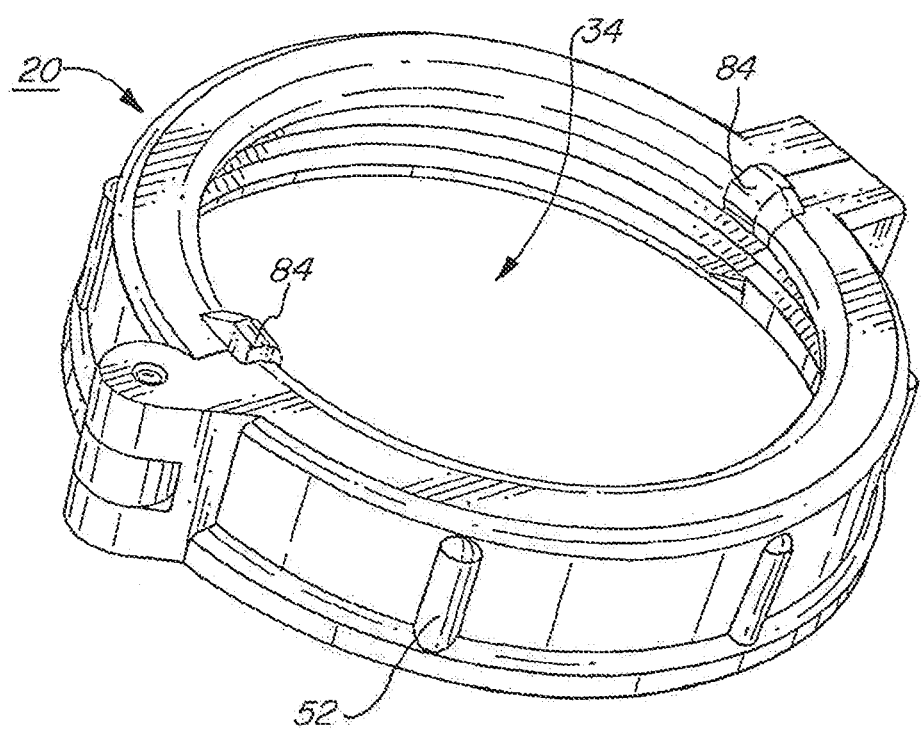
FIG. 2 is a perspective view of the non-metallic electrical insulating bushing shown in FIG. 1 with the bushing in its closed configuration.
Figure 12:
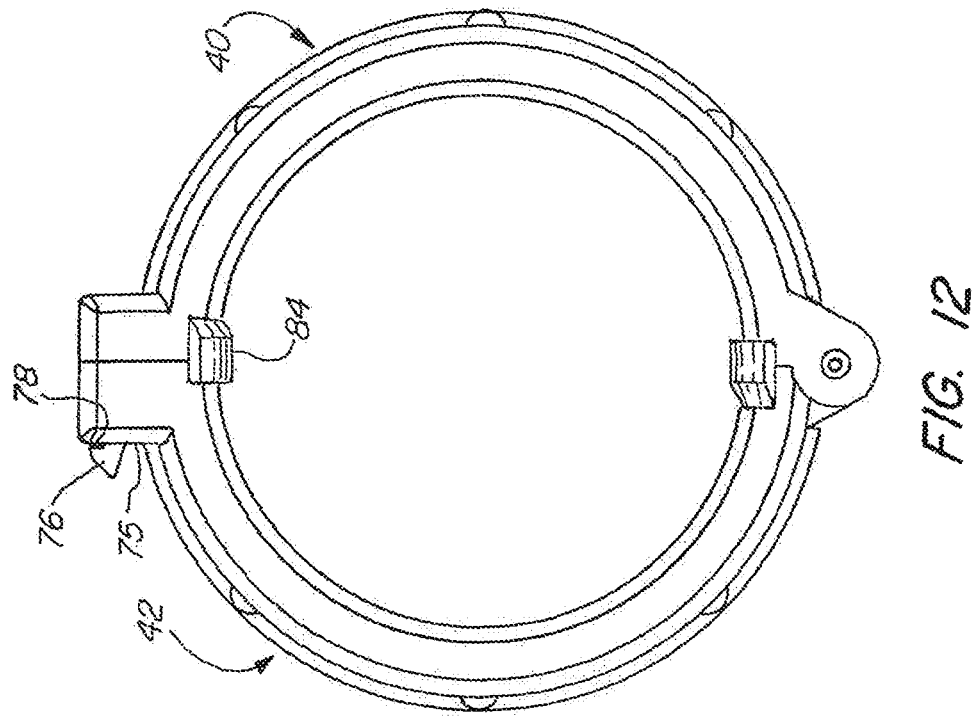
FIG. 12 is a top view of the non-metallic electrical insulating bushing.
Figure 11:
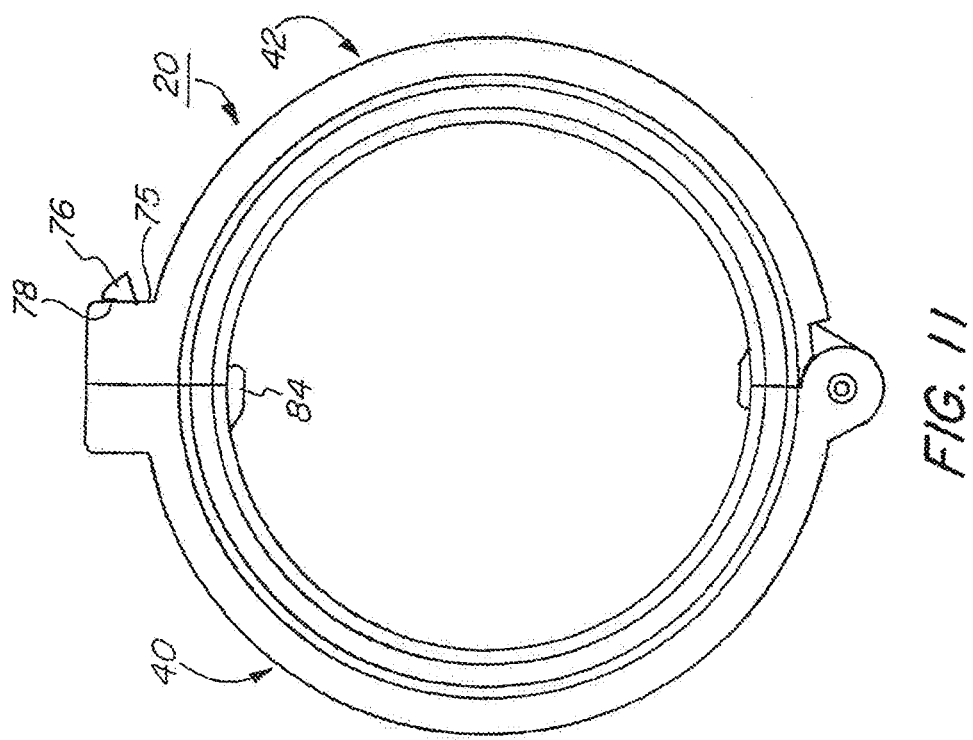
FIG. 11 is a bottom view of the non-metallic electrical insulating bushing.
Figure 13:
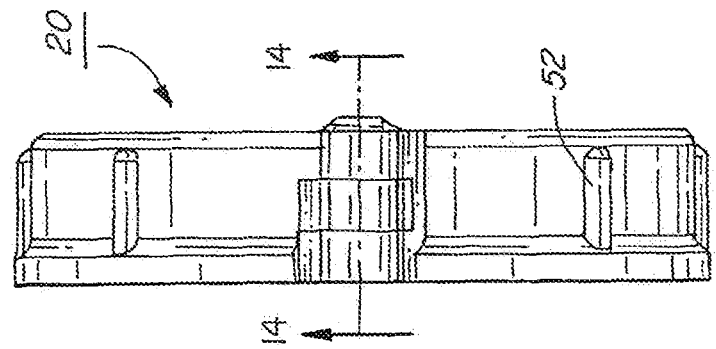
FIG. 13 is a side view of the non-metallic electrical insulating bushing.
Figure 14:
FIG. 14 is a side cross-sectional view of the non-metallic electrical insulating bushing taken along line 14-14 of FIG. 13.

As best seen in FIGS. 1, 1A, 1B and 2, a split, non-metallic electrical insulating bushing 20 according to a first embodiment of the present invention is configured to rotate from an open position as shown in FIGS. 1A and 1B to a closed position as seen in FIG. 2. FIG. 1 shows the bushing in a disassembled arrangement. In addition, FIG. 11 shows a bottom view of the bushing from the conduit inlet end while FIG. 12 shows a top view of the bushing from the conduit outlet end. The bushing may be specifically configured to have internal threads 22 formed on rims 50 for threaded engagement with threads 24 formed on an end 36 of an electrical conduit 26.

Figure 5:
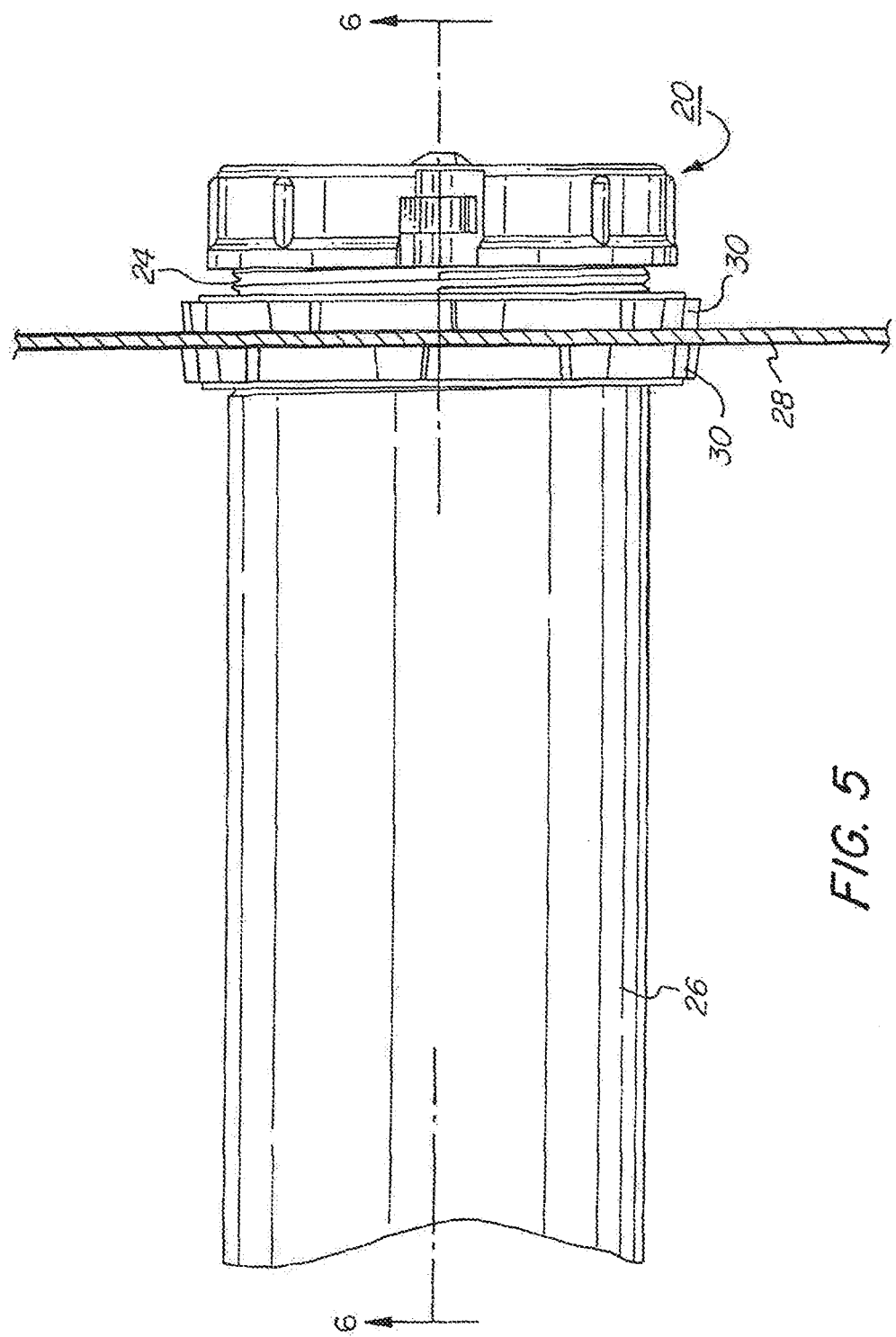
FIG. 5 is a side view of the non-metallic electrical insulating bushing attached to an electrical conduit that is secured to an electrical box or an electrical enclosure by locknuts.
Figure 6:
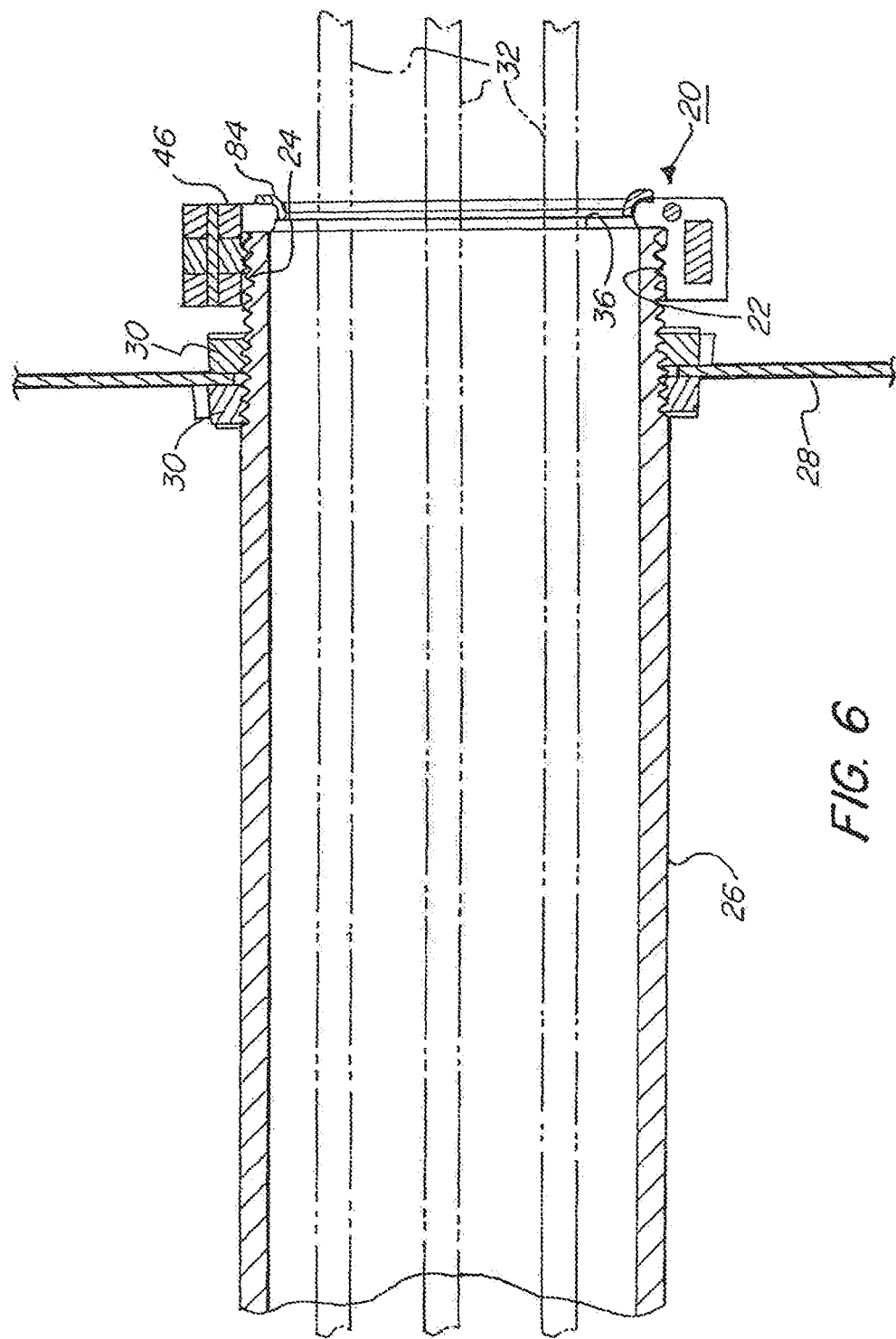
FIG. 6 is a cross-sectional view of the non-metallic electrical insulating bushing and electrical conduit taken along line 6-6 of FIG. 5.
Figure 10:
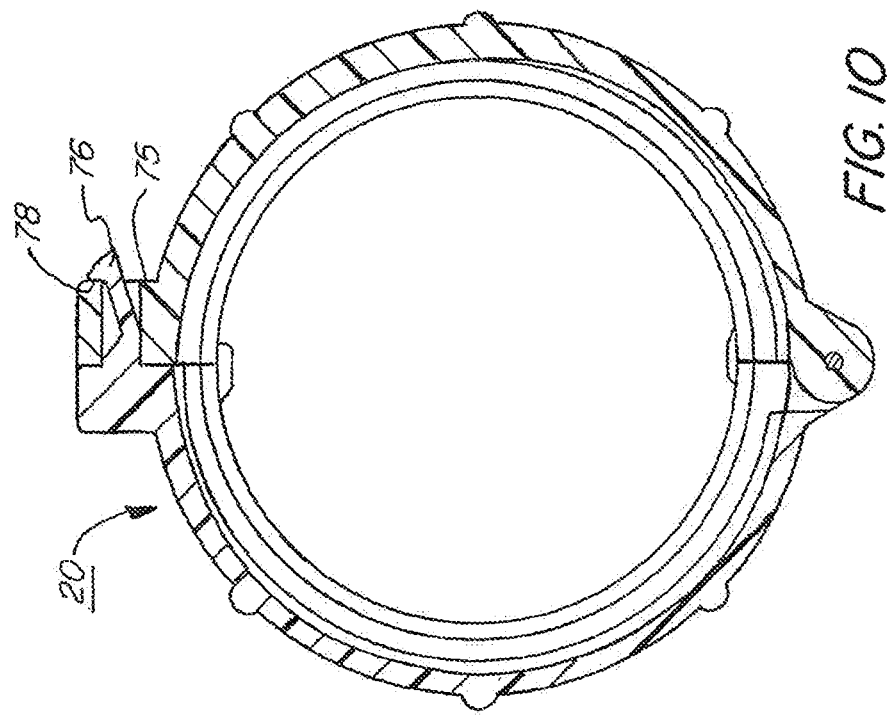
FIG. 10 is a view of the non-metallic electrical insulating bushing taken along line 10-10 of FIG. 9.
Figure 9:
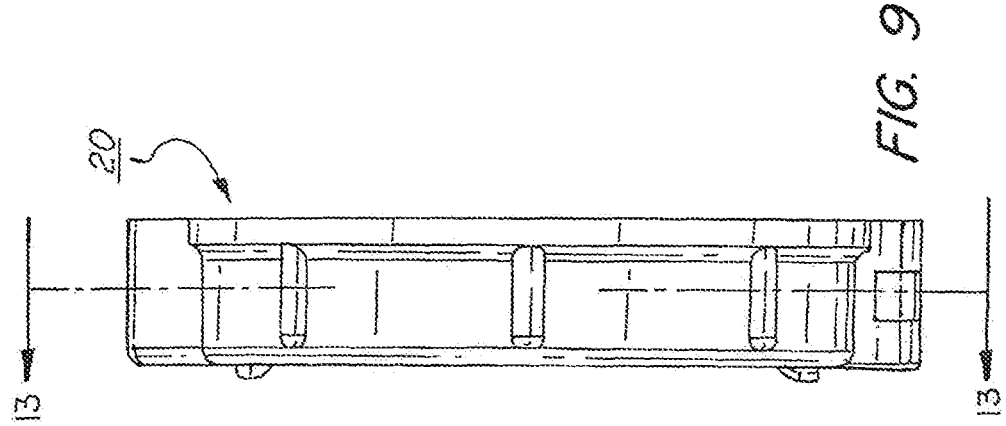
FIG. 9 is a side view of the non-metallic electrical insulating bushing.

FIGS. 3 and 4 show the insulating bushing threaded to the terminating end 36 of an electrical conduit 26, while FIGS. 5 and 6 show the electrical conduit passing through an opening in an electrical box or electrical enclosure 28 and secured to the box or enclosure by means of locknuts 30.

As seen in FIG. 6, insulated electrical conductors 32 pass through the electrical conduit, as well as through a central opening 34 of the insulating bushing when the bushing is in its closed configuration. Electrical conductors 32 are formed with a conducting core (stranded wire or solid conductor) and an outer insulating covering, the latter of which is shown in FIG. 6. Once the insulating bushing is installed on an end of the electrical conduit, it provides protection to the electrical conductors by preventing chafing of the insulation against the terminating end 36 of the electrical conduit. In this regard, it should be noted that electrical conduits are typically fabricated from metal, such as steel, and therefore their terminating ends have the potential for abrading or chafing the insulation of the electrical conductors, especially if the conductors bend after exiting the conduit.

FIG. 1 shows the three components of the insulating bushing, namely, a first insulating bushing portion 40, a second insulating bushing portion 42 and a hinge pin 44. As seen in FIGS. 1A, 1B and 2, the first and second insulating portions have a rim 50 that has a substantially hemispherical shape. Each bushing portion may include a flange 46 that projects radially inward from the rim so as to optionally overlie terminating end 36 of the electrical conduit 26.

Each hemispherically shaped rim 50 may have internal threads 22 as shown for threaded engagement with threads 24 on electrical conduit 26. Each rim may include ribs 52 formed on the outer surface thereof, the ribs dimensioned to assist gripping of the insulating bushing so as to facilitate installation of the insulating bushing onto the end of an electrical conduit. As seen in FIGS. 1, 1A and 1B, the first insulating bushing portion 40 has a first end 56 that includes at least one bore 58 formed therein for passage of hinge pin 44. In the configuration shown in FIG. 1, the first end of the first insulating portion has a bifurcated configuration with two bores 58 formed therein, one in each bifurcated section 57. Other configurations, such as a non-bifurcated configuration with one bore, could be used.

As seen in FIGS. 1, 1A and 1B, the second insulating bushing portion 42 has a first end 60 with a bore 62 formed therein. Bore 62 is also dimensioned for passage of hinge pin 44.

Although a hinge pin connects the bushing portions to each other, other mechanisms could be used; e.g., projections on one bushing portion and corresponding depressions on the other bushing portion.

As seen in FIGS. 1A, 1B, 8, 10-12, and 15-18, the first insulating bushing portion 40 has a second end 66 that includes a projection clasp member 68 having a hook portion 76. The second insulating bushing portion 42 also has a second end 72 having a recess 74 formed therein about surface 7. The recess may pass through second end 72 and thus passes through a surface 75 of second end 72.

Figure 15:
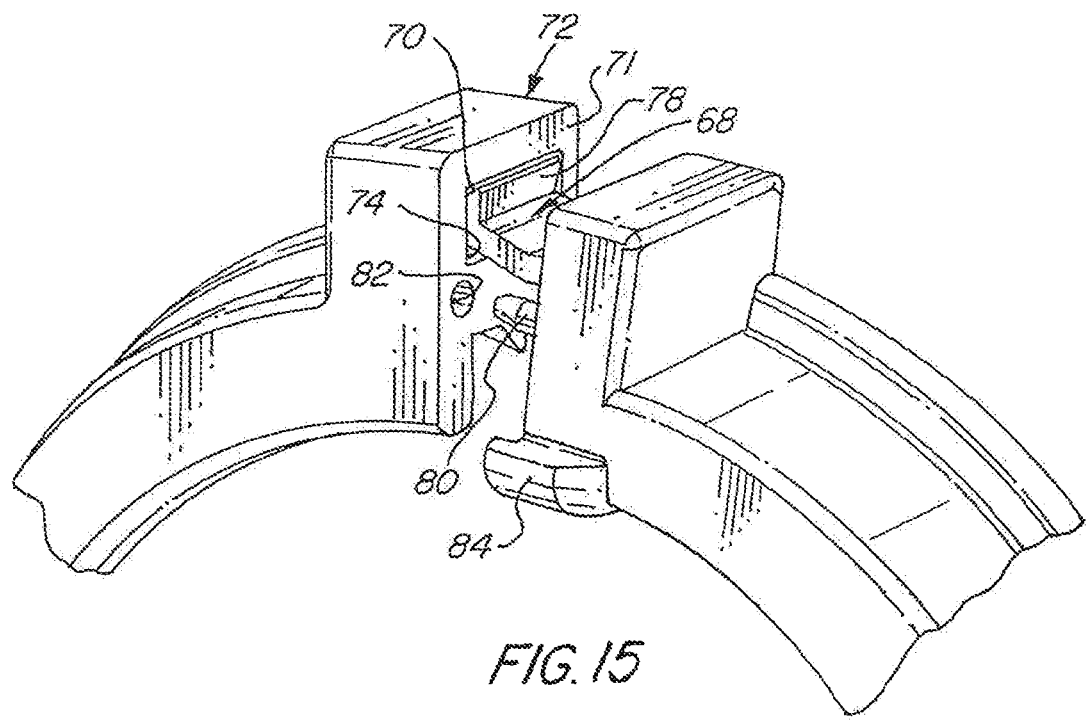
FIG. 15 is an enlarged perspective view of the second ends of the first and second bushing portions as a hook portion of a projection latch member of the first bushing portion initially engages a recess in the second bushing portion.
Figure 16:
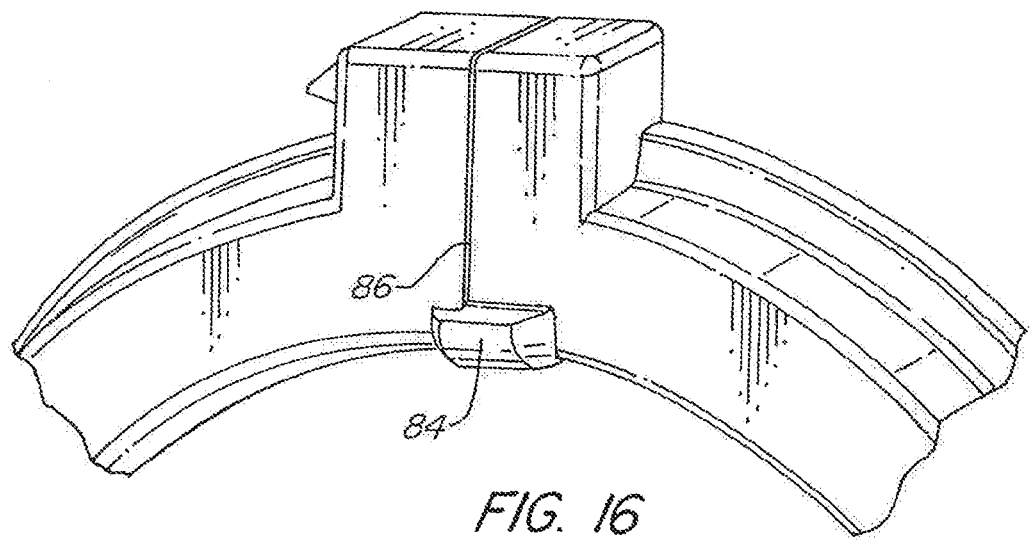
FIG. 16 is an enlarged perspective view of the second ends of the first and second bushing portions when the bushing is in the closed configuration.
Figure 17:
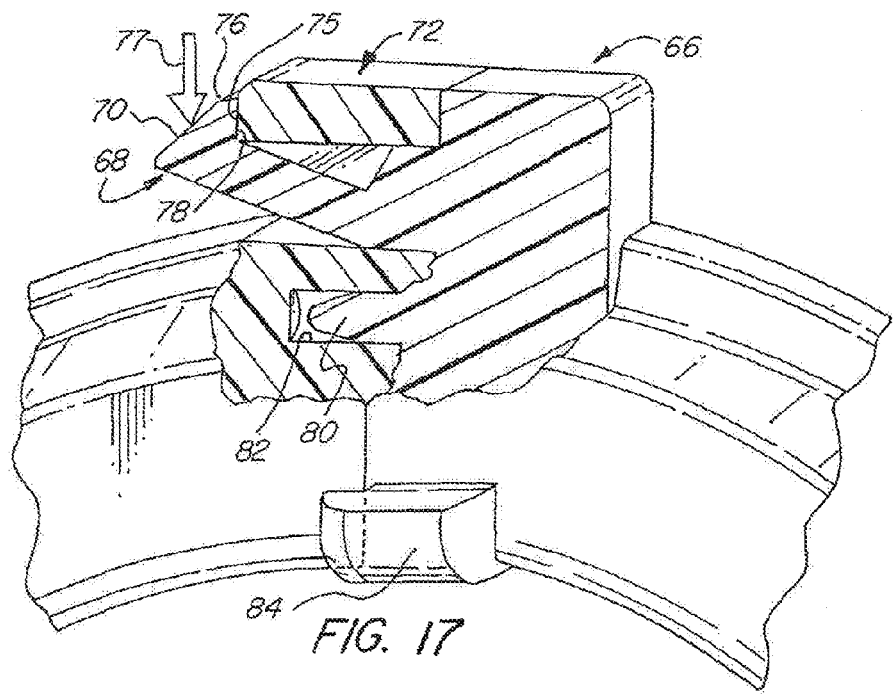
FIG. 17 is an enlarged, partially broken away perspective view of the latch and recess shown in FIG. 16 when the bushing is in the closed configuration.
Figure 18:
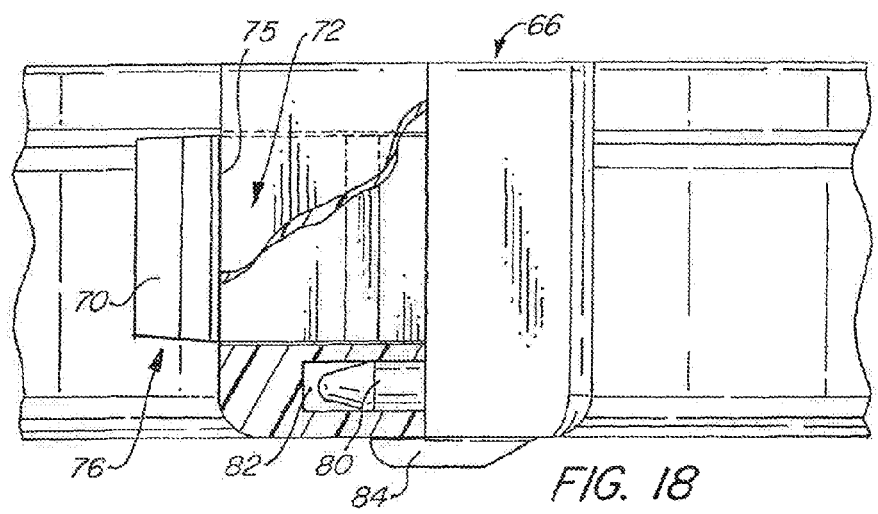
FIG. 18 is an enlarged partially broken away view similar to FIG. 17, taken in a direction toward the circumferential outer perimeter of the bushing.

The projection clasp member 68 is angled relative to the recess 74 when the first insulating bushing portion and the second insulating bushing portion are rotated from their open configuration as shown in FIGS. 1A, 1B, and 15 toward their closed configuration as shown in FIGS. 2 and 16-18 so as to align the second end of the first insulating bushing portion with the second end of the second insulating bushing portion as the projection clasp member is inserted within recess 74. In particular, as best seen in FIG. 15, as hook portion 76 of projection clasp member 68 enters recess 74, surface 70 of the hook portion contacts surface 71 of second end 72 forming recess 74. This causes projection clamp member 68 to self-align with the recess, thereby insuring that the two bushing portions 40 and 42 are aligned with respect to each other. This alignment also helps insure alignment of projection pin 80 with orifice 82 as discussed below.

As also seen in FIGS. 1, 1B, 15, 17 and 18, as the projection clasp member is fully inserted within recess 74, its hook portion 76 projects out of recess 74 so that surface 78 of the hook portion makes contact with surface 75 of second end 72 (see also FIG. 1A) in a snap-action manner. Thus, when the bushing is in its closed configuration, the projection clasp member 68 resists opening of the bushing even when subjected to external forces such as when electrical conductors 32 make contact with the bushing.

As also seen in FIGS. 10-12, 17 and 18, the bushing can still be easily opened by depressing hook portion 76 in the direction of arrow 77, which thereby allows the hook portion and the remainder of the projection clasp member to be withdrawn from recess 74.

As discussed above, the first insulating bushing portion may also include a projecting pin 80, while the second insulating bushing portion may include an orifice 82 which as seen in FIGS. 8, 15, 17 and 18 is positioned for receipt of the projecting pin 80 when the insulating bushing is in its closed configuration. The projecting pin when positioned in orifice 82 provides additional stability to the insulating bushing when in the closed configuration. This additional stability to the insulating bushing when in the closed configuration helps resist accidental opening of the insulating bushing once it has been secured to the end of an electrical conduit.

As also seen in FIGS. 2, 8, 15, 16 and 17, the first insulating bushing portion and the second insulating bushing portion each include a seam cover 84 for overlying gaps 86 between respective first and second ends of the first and second insulating bushing portions. These seam covers thereby minimize any possibility of an electrical conductor coming in contact with either of these gaps 86.

The first and second insulating portions are preferably formed from a thermoplastic materials, such as nylon, polyvinylchloride (PVC), acrylonitrile butadiene styrene (ABS), polycarbonate plastic (PC), and other similar materials. The hinge pin may be fabricated from zinc plated steel and pressed into the orifices formed in the first and second insulating portions.

Figure 19A:
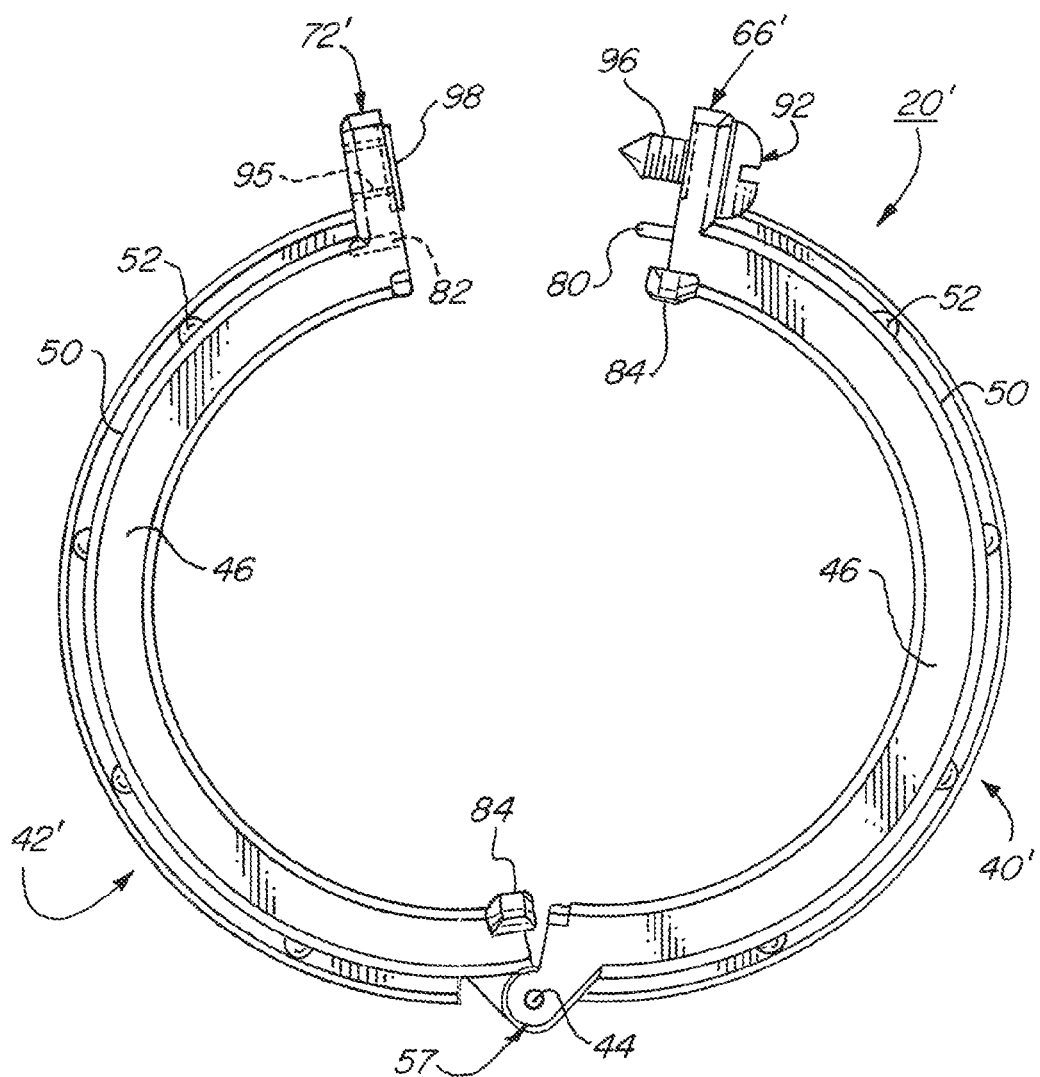
FIG. 19A is a top view of the non-metallic electrical insulating bushing shown in FIG. 19 taken from a conduit outlet end showing the bushing in an open configuration.
Figure 20:
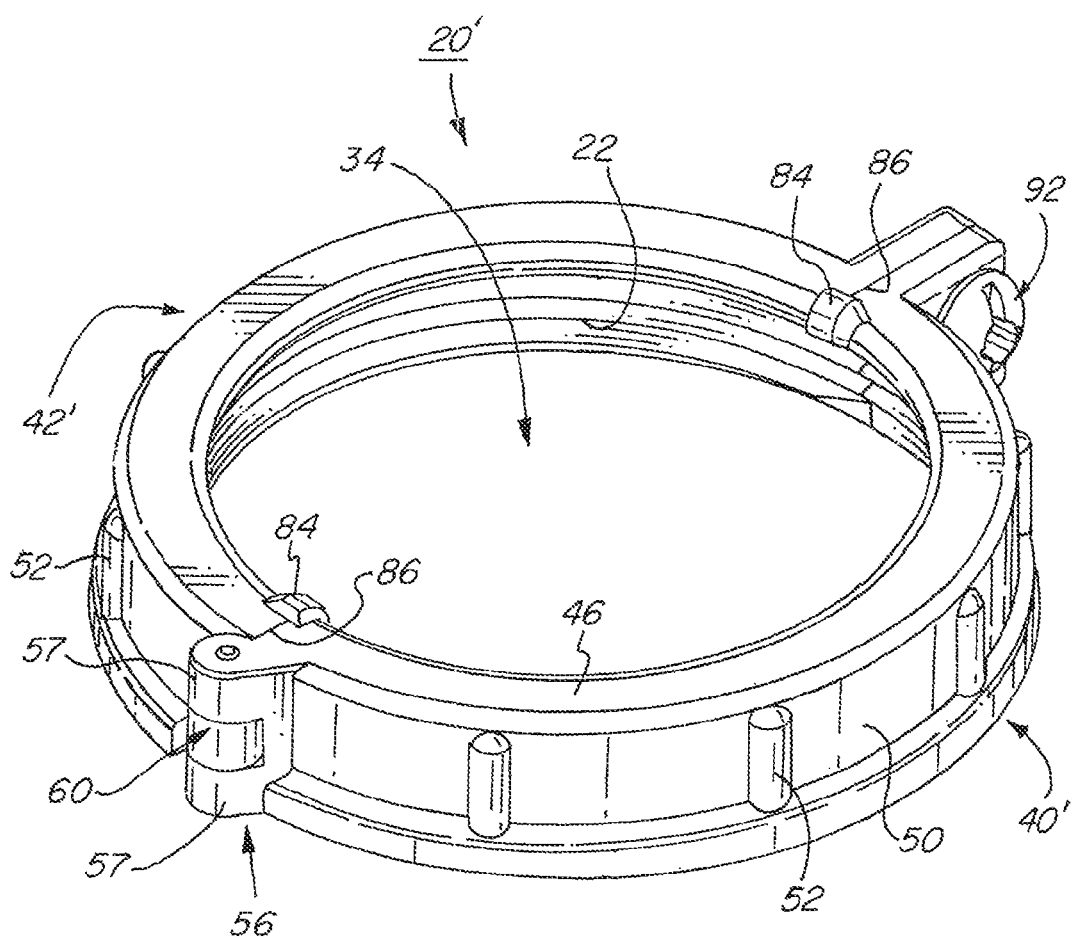
FIG. 20 is a perspective view of the non-metallic electrical insulating bushing shown in FIG. 19 with the bushing in its closed configuration.
Figure 23:
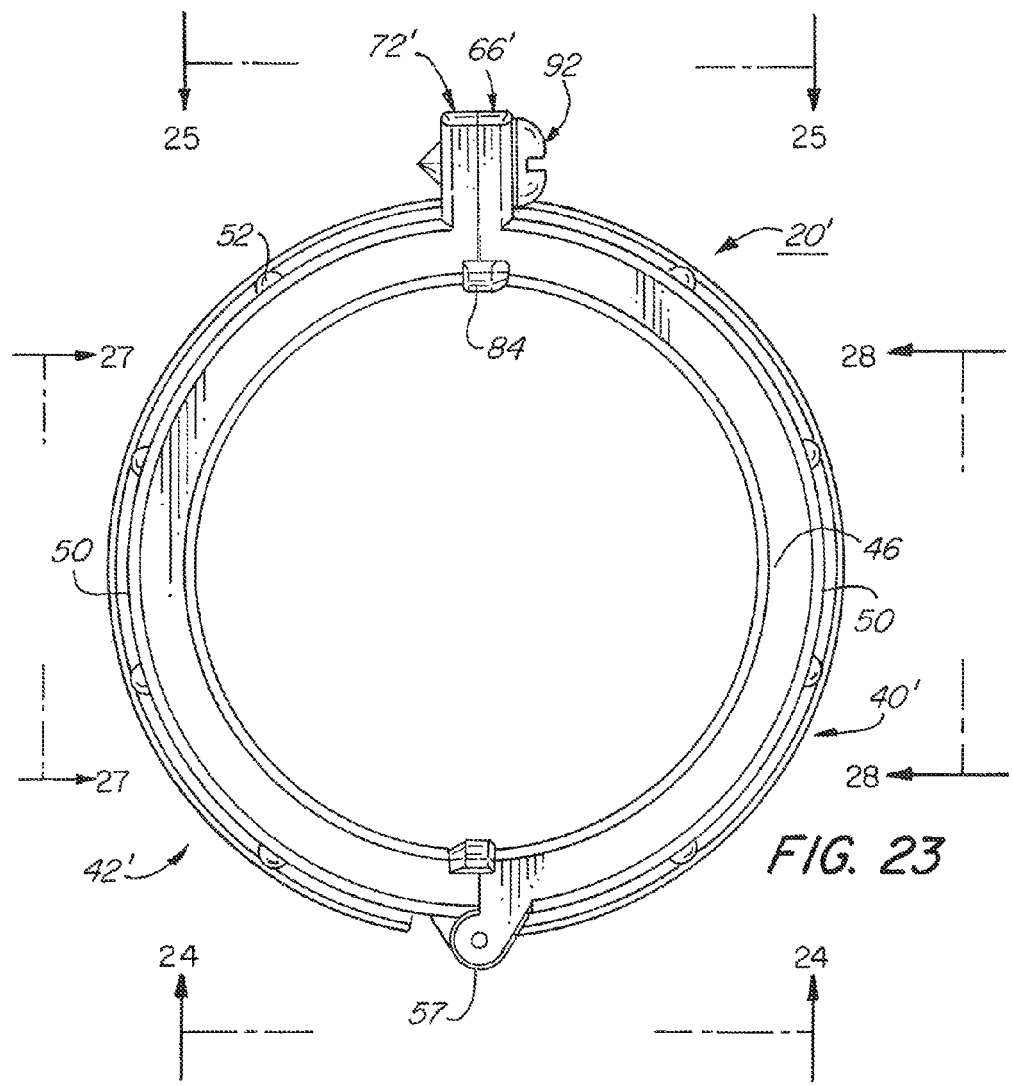
FIG. 23 is a top view of the non-metallic electrical insulating bushing shown in FIGS. 19-22.
Figure 24:
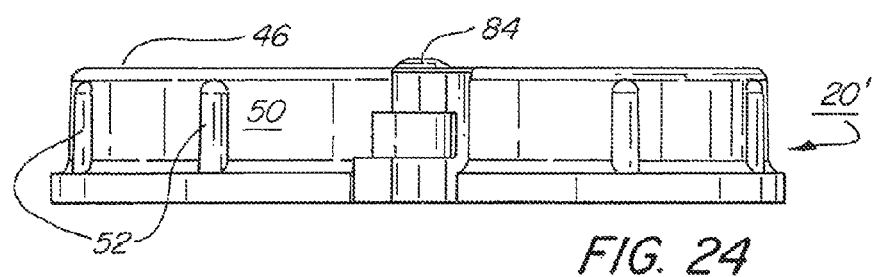
FIG. 24 is a side view of the non-metallic electrical insulating bushing shown in FIG. 23 taken along the hinge side of the bushing as shown by line 24-24 of FIG. 23.
Figure 25:
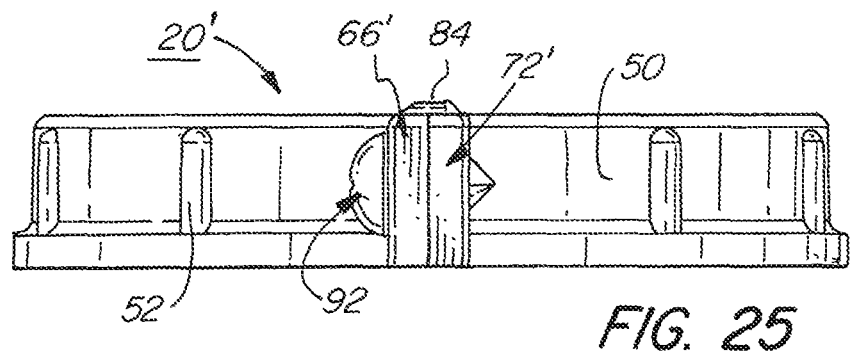
FIG. 25 is a side view of the non-metallic electrical insulating bushing shown in FIG. 23 taken from a second end of the first and second hemispherically-shaped bushing portions forming the insulating bushing as shown by line 25-25 of FIG. 23.
Figure 26:
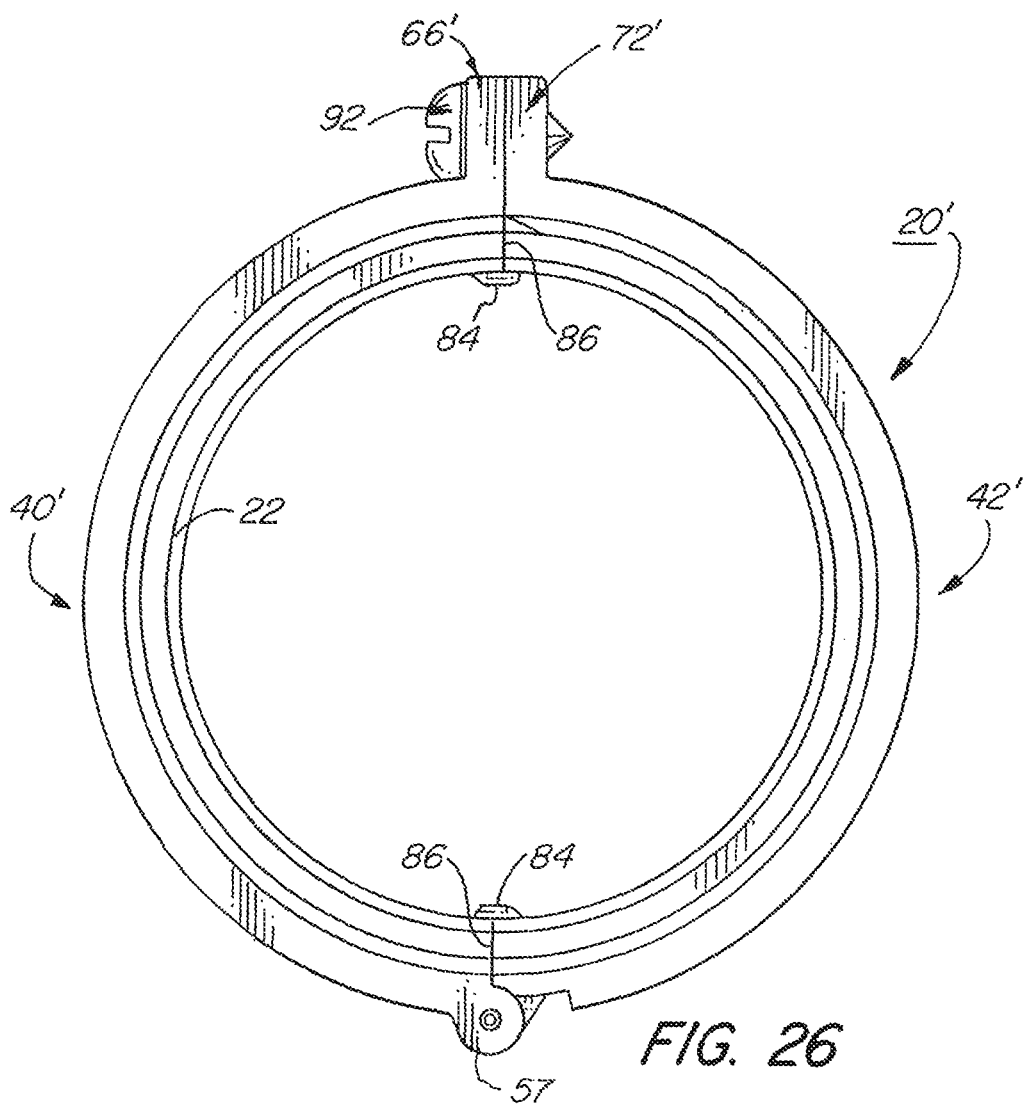
FIG. 26 is a bottom view of the non-metallic electrical insulating bushing shown in FIGS. 19 and 20.
Figure 27:
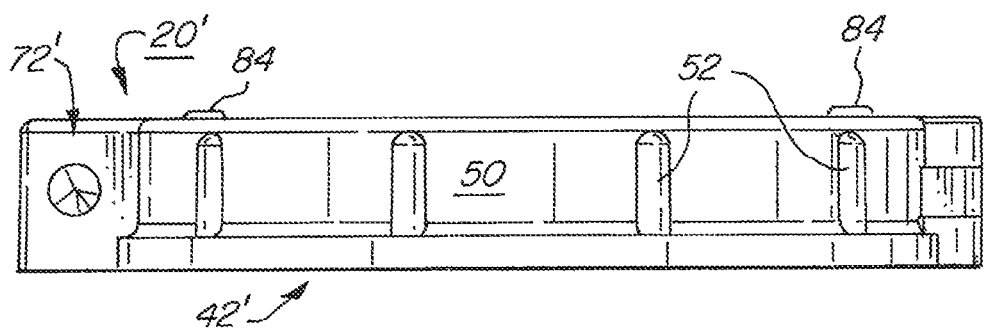
FIG. 27 is a side view of the non-metallic electrical insulating bushing taken along line 27-27 of FIG. 23.
Figure 28:
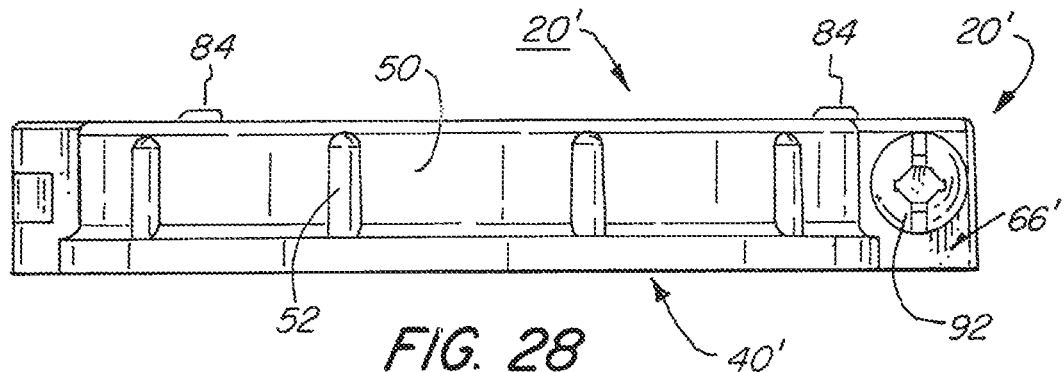
FIG. 28 is a side view of the non-metallic electrical insulating bushing taken along line 28-28 of FIG. 23.

FIGS. 19, 19A and 20 show an alternative embodiment of a split, non-metallic electrical insulating bushing 20' that is configured to rotate from an open position as shown in FIG. 19A to a closed position as seen in FIG. 20 (the same reference numbers for corresponding elements as shown in FIGS. 1-18 for the first embodiment are used for this alternative embodiment). FIG. 19 shows the bushing in a disassembled arrangement (exploded view). In addition, FIG. 26 shows a bottom view of the bushing from its end that connects to a conduit while FIG. 23 shows a top view of the bushing from a conduit outlet end. The bushing may be specifically configured to have internal threads 22 formed on rims 50 for threaded engagement with threads 24 formed on an end 36 of an electrical conduit 26.

Figure 21:
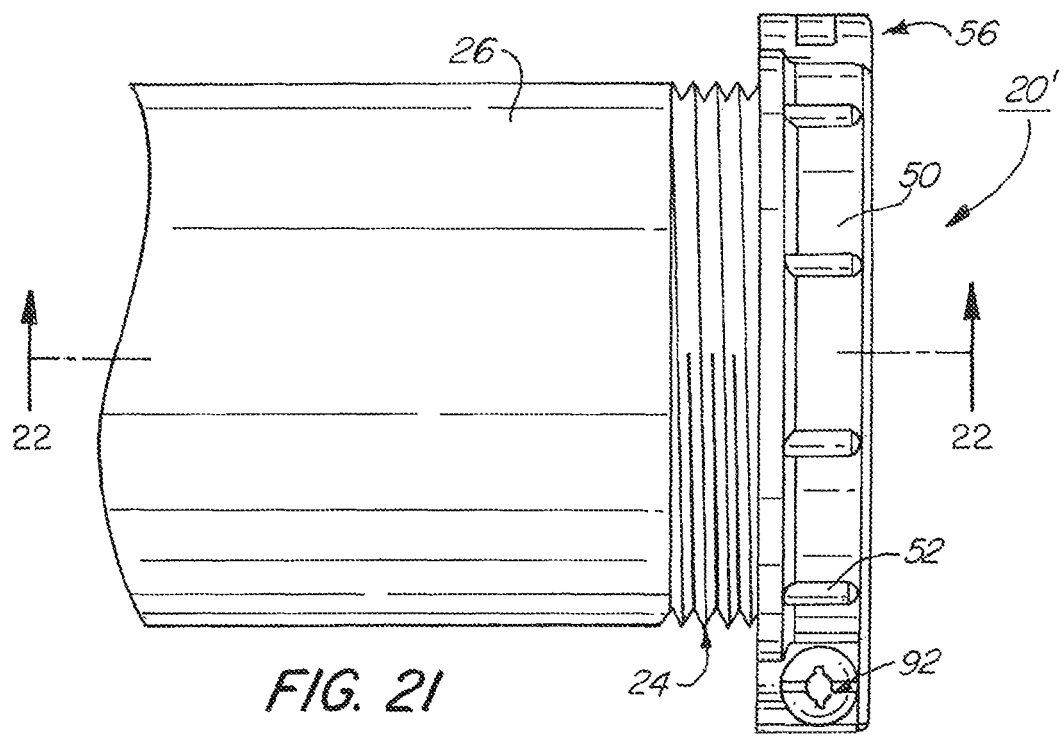
FIG. 21 is a side view of the non-metallic electrical insulating bushing shown in FIGS. 19 and 20 attached to an electrical conduit.
Figure 22:
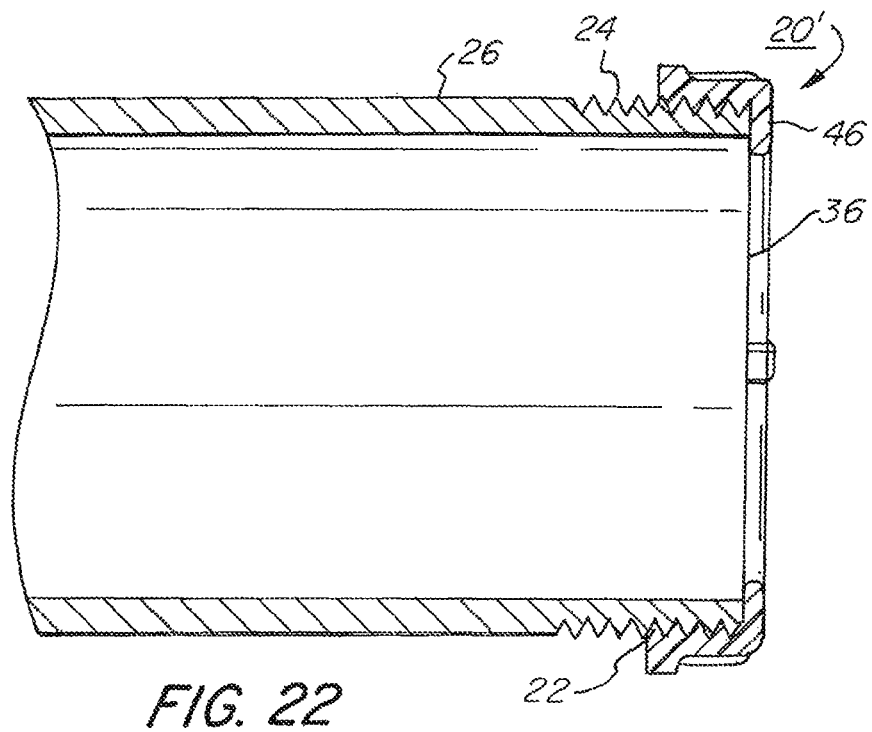
FIG. 22 is a cross-sectional view of the non-metallic electrical insulating bushing and conduit shown in FIG. 21 taken along line 22-22 of FIG. 21.

FIGS. 21 and 22 show the insulating bushing threaded to the terminating end 36 of an electrical conduit 26. If the insulating bushing is secured to an opening in an electrical box or electrical enclosure it is secured thereto in the same manner as shown in FIGS. 5 and 6 where an electrical conduit 26 passes through an opening in an electrical box or electrical enclosure 28 and is secured to the box or enclosure by means of locknuts 30.

As also seen in FIG. 6, insulated electrical conductors 32 pass through the electrical conduit, as well as through a central opening 34 of the insulating bushing when the bushing is in its closed configuration. Electrical conductors 32 are formed with a conducting core (stranded wire or solid conductor) and an outer insulating covering, the latter of which is shown in FIG. 6. Once the insulating bushing is installed on an end of the electrical conduit, it provides protection to the electrical conductors by preventing chafing of the insulation against the terminating end 36 of the electrical conduit. In this regard, it should be noted that electrical conduits are typically fabricated from metal, such as steel, and therefore their terminating ends have the potential for abrading or chafing the insulation of the electrical conductors, especially if the conductors bend after exiting the conduit.

FIG. 19 shows the three components of the insulating bushing, namely, a first insulating bushing portion 40', a second insulating bushing portion 42' and a hinge pin 44 or other means (discussed below) for allowing the first insulating portion and second insulation portion to rotate with respect to each other. As seen in FIGS. 19, 20 and 22, the first and second insulating portions have a rim 50 that has a substantially hemispherical shape. Each bushing portion may include a flange 46 that projects radially inward from the rim so as to optionally overlie terminating end 36 of the electrical conduit 26 (see FIG. 22).

Each hemispherically shaped rim 50 may have internal threads 22 as shown for threaded engagement with threads 24 on electrical conduit 26. Each rim may include ribs 52 formed on the outer surface thereof, the ribs dimensioned to assist gripping of the insulating bushing so as to facilitate installation of the insulating bushing onto the end of an electrical conduit. As seen in FIGS. 19 and 19A, the first insulating bushing portion 40' has a first end 56 that includes at least one bore 58 formed therein for passage of hinge pin 44. In the configuration shown in FIG. 19, the first end of the first insulating portion has a bifurcated configuration with two bores 58 formed therein, one in each bifurcated section 57. Other configurations, such as a non-bifurcated configuration with one bore, could be used.

As seen in FIGS. 19 and 19A, the second insulating bushing portion 42' has a first end 60 with a bore 62 formed therein. Bore 62 is also dimensioned for passage of hinge pin 44.

Although a hinge pin connects the bushing portions to each other, other mechanisms could be used; e.g., projections on one bushing portion and corresponding depressions on the other bushing portion.

As seen in FIGS. 19, 19A, 23 and 26, the first insulating bushing portion 40' has a second end 66' that includes a through bore 90 for receipt of a fastener 92, such as a machine screw or a self-tapping screw (a screw having coarser thread as compared to a comparable machine screw). The second insulating bushing portion 42' also has a second end 72' having an aperture 94 which may be a through bore. This aperture/bore can have threads 95 for threaded engagement with threads 96 of machine screw 92. The fastener may also pass through the aperture 94 and be secured to second end 72' by a nut (not shown). A retaining washer 98, such as a plastic washer, may be placed on machine screw 92 to secure it to second end 66' of first bushing portion 40' prior to securement to second end 72' of second bushing portion 42'. The retaining washer has a hole diameter slightly smaller than the outer diameter of the machine screw and is pushed over the threads of the machine screw once the machine screw is passed through bore 90. A recess 100 may be formed in second end 72' of second insulating bushing portion 42' about aperture/bore 94 for receipt of the retaining washer once the second ends 66' and 72 are secured to each other. Fastener 92 may alternatively be a self-tapping screw. In this embodiment, threads 95 in aperture 94 may be eliminated since self-tapping screw 92 has threads 96 which self-tap when screwed into aperture 94. A retaining washer may also be used with the self-tapping screw to secure the screw to second end 66' of first bushing portion 42'. FIGS. 20, 23 and 25-28 show the insulating bushing 20' in a closed configuration when fastener 92 has secured second ends 66' and 72' of first and second insulating bushing portions 40' and 42' together.

As discussed above, the first insulating bushing portion 40' includes a projecting pin 80, while the second insulating bushing portion include an orifice 82 which as seen in FIGS. 19 and 19A is positioned for receipt of the projecting pin 80 when the insulating bushing is in its closed configuration. The projecting pin when positioned in orifice 82 provides additional stability to the insulating bushing when in the closed configuration. This additional stability to the insulating bushing when in the closed configuration helps resist accidental opening of the insulating bushing once it has been secured to the end of an electrical conduit.

As also seen in FIGS. 19, 19A, 20, 23 and 26, the first insulating bushing portion and the second insulating bushing portion each include a seam cover 84 for overlying gaps 86 between respective first and second ends of the first and second insulating bushing portions. These seam covers thereby minimize any possibility of an electrical conductor coming in contact with either of these gaps 86.

The first and second insulating bushing portions are preferably formed from a thermoplastic materials, such as nylon, polyvinylchloride (PVC), acrylonitrile butadiene styrene (ABS), polycarbonate plastic (PC), and other similar materials. The hinge pin may be fabricated from zinc plated steel and pressed into the orifices formed in the first and second insulating portions.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A split, non-metallic electrical insulating bushing for placement on a terminating end of an electrical conduit, the bushing rotatable between a first open configuration and a second closed configuration comprising:

a first electrical insulating bushing portion having a substantially hemispherical shape with a first end and a second end, the first bushing portion including a rim, a second electrical insulating bushing portion having a substantially hemispherical shape with a first end and a second end, the first end dimensioned to rotate with the first end of the first insulating bushing portion, the second bushing portion including a rim, and means for allowing the first end of the first insulating bushing portion and the first end of the second insulating bushing portion to rotate with respect to each other, wherein the second end of the first insulating bushing portion includes a through bore for passage of a fastener, wherein the second end of the second insulating bushing portion includes an aperture dimensioned for receipt of the fastener, and wherein one end of the first insulating bushing portion has a seam cover that is dimensioned to overlie a gap between said end and the corresponding end of the second insulating bushing portion when the bushing is in the second closed configuration and wherein the second insulating bushing portion includes a seam cover that is dimensioned to overlie a gap between its other end and the corresponding other end of the first insulating bushing portion when the bushing is in the second closed configuration.

2. The split, non-metallic electrical insulating bushing according to claim 1, wherein the aperture of the second insulating bushing portion is threaded and wherein the fastener has threads for engagement therewith.

3. The split, non-metallic electrical insulating bushing according to claim 1, wherein the aperture of the second insulating bushing portion passes through the second end of the second insulating bushing portion and wherein the fastener is dimensioned to pass through said aperture.

4. The split, non-metallic electrical insulating bushing according to claim 3, wherein the fastener is secured to the second end of the second insulating bushing portion by a nut.

5. The split, non-metallic electrical insulating bushing according to claim 1, wherein the first bushing portion has a flange attached to the rim, the flange projecting radially inward so as to overlie the terminating end of an electrical conduit when installed thereon and wherein the second bushing portion has a flange attached to the rim, the flange of the second insulating bushing projecting radially inward so as to overlie the terminating end of an electrical conduit when installed thereon.

6. The split, non-metallic electrical insulating bushing according to claim 1, wherein the rim of the first insulating bushing portion and the rim of the second insulating bushing portion each include threads formed on an interior surface thereof, said threads dimensioned for threading engagement with threads formed on a terminating end of an electrical conduit.

7. The split, non-metallic electrical insulating bushing according to claim 1, wherein the means for allowing the first end of the first insulating bushing portion and the first end of the second insulating bushing portion to rotate with respect to each other includes a hinge pin and where the first end of the first insulating bushing portion and the first end of the second insulating bushing portion have bores formed therein for receipt of said hinge pin.

8. The split, non-metallic electrical insulating bushing according to claim 7, wherein the hinge pin is fabricated from zinc plated steel.

9. The split, non-metallic electrical insulating bushing according to claim 1, wherein the rim of the first insulating bushing portion and the rim of the second insulating bushing portion end each include a plurality of ribs dimensioned to assist gripping the bushing.

10. The split, non-metallic electrical insulating bushing according to claim 1, wherein the first insulating bushing portion and the second insulating bushing portion are formed from a thermoplastic material.

11. The split, non-metallic electrical insulating bushing according to claim 1, wherein the fastener is a machine screw.

12. The split, non-metallic electrical insulating bushing according to claim 1, wherein the fastener is a self-tapping machine screw.

13. The split, non-metallic electrical insulating bushing according to claim 1, wherein a retaining washer is positioned on the fastener after passage of the fastener through the bore on the second end of the first insulating bushing portion.

14. The split, non-metallic electrical insulating bushing according to claim 13, wherein the first end of the second insulating bushing portion include a recess formed around the aperture, said recess dimensioned for receipt of the retaining washer when the bushing is in the closed configuration.

15. The split, non-metallic electrical insulating bushing according to claim 1, wherein the second end of the first insulating portion further comprises a projecting pin and wherein the second end of the second insulating portion further has an orifice formed therein dimensioned for receipt of the projecting pin when the split, non-metallic insulating bushing is in its second closed configuration, thereby providing enhanced securement of the split non-metallic insulating bushing when in the second closed configuration.

16. The split, non-metallic electrical insulating bushing according to claim 15, wherein the aperture of the second insulating bushing portion is threaded and wherein the fastener has threads for engagement therewith.

17. The split, non-metallic electrical insulating bushing according to claim 15, wherein the first bushing portion has a flange attached to the rim, the flange projecting radially inward so as to overlie the terminating end of an electrical conduit when installed thereon and wherein the second bushing portion has a flange attached to the rim, the flange projecting radially inward so as to overlie the terminating end of an electrical conduit when installed thereon.

18. The split, non-metallic electrical insulating bushing according to claim 15, wherein the means for allowing the first end of the first insulating bushing portion and the first end of the second insulating bushing portion to rotate with respect to each other includes a hinge pin and where the first end of the first insulating bushing portion and the first end of the second insulating bushing portion have bores formed therein for receipt of said hinge pin.

* * * * *